United States Patent [19]

Bertram et al.

[11] Patent Number: 5,261,104
[45] Date of Patent: Nov. 9, 1993

[54] FLEXIBLE COMPUTER INITIALIZATION

[75] Inventors: Randal L. Bertram; Randal H. Cecil; Jeffrey V. Ford; Jerry T. Kozel, all of Lexington, Ky.; Rodney P. Springhetti, Toronto, Canada; Glenn E. Welman, Lexington, Ky.; John P. Wright, Boca Raton, Fla.

[73] Assignee: International Business Machines, Armonk, N.Y.

[21] Appl. No.: 976,648

[22] Filed: Nov. 13, 1992

Related U.S. Application Data

[63] Continuation of Ser. No. 497,384, Mar. 22, 1990, abandoned.

[51] Int. Cl.⁵ .................. G06F 9/44; G06F 9/445; G06F 1/21
[52] U.S. Cl. .................. 395/700; 364/DIG. 1; 364/280.2; 364/280.3; 364/281.9
[58] Field of Search .................................... 395/700

[56] References Cited

U.S. PATENT DOCUMENTS 4,403,303  9/1983  Howes et al. ............. 364/200
5,134,580  7/1992  Bertram et al. .......... 395/650

FOREIGN PATENT DOCUMENTS 0267663   5/1988  European Pat. Off.
61-221921 10/1986  Japan.
63-29861   2/1988  Japan.
63-058536  3/1988  Japan.
63-271528 11/1988  Japan.

OTHER PUBLICATIONS

Japanese Technology Disclosure 128901.

Primary Examiner—Gareth D. Shaw
Assistant Examiner—A. Katbab
Attorney, Agent, or Firm—Greenlee & Winner

[57] ABSTRACT

A computer system with an internal operating system located in ROM is initialized in that operating system but can also automatically be directly initialized in an operating system of choice such as one located on an external memory, that is, a diskette or fixed disk. The computer system may also automatically be directly initialized in an application running under the internal operating system and, if desired, initialization may automatically directly include a customized version of the internal operating system. These customizing features are obtained through a customization word located in permanent read/write memory.

8 Claims, 6 Drawing Sheets

FLEXIBLE COMPUTER INITIALIZATION

This is a continuation of copending application Ser. No. 07/497,384, filed on Mar. 22, 1990, now abandoned.

This invention relates to the initialization of computers and more specifically relates to a system which allows the computer user to select the manner in which the computer will be initialized.

RELATED PATENT APPLICATIONS

U.S. Pat. No. 5,134,580 and U.S. patent application Ser. No. 07/609,051 show additions to the initializing procedure of the current invention.

BACKGROUND OF THE INVENTION

Personal computer systems always include means for initializing the computer when the power is turned on. Ordinarily, the booting sequence includes various tests of computer components to determine whether everything connected in the system is in operating order. Ultimately, a screen is presented to the computer user to enable interaction through which commands can be received.

It is common for initialization routines to include bringing up an operating system such as, for example, the IBM Disk Operating System (DOS) so that upon turning on the computer the system initialization includes loading DOS and eventually providing a "DOS prompt" on the screen for interaction. Typically, the user will have selected the operating system to be used such as IBM DOS and will have placed a diskette containing the DOS into a diskette drive so that the boot-up procedure can include loading DOS. If desired, the user may have copied the operating system onto a fixed disk associated with the system so that the diskette need not be inserted every time the computer is turned on.

Once a computer has been initialized and an operating system such as IBM DOS is resident, application programs which run under the operating system can be used. For example, word processors which operate under the operating system can be utilized, spreadsheet programs can be utilized, and information applications such as stock quotations or educational services or User's Club can be run.

In order to save time for the user, a personal computer has been developed with the IBM DOS operating system located in read-only-memory (ROM) so that initialization of the machine directly brings the machine up with that operating system ready to use, thus avoiding the need for the computer user to insert a diskette containing an operating system into the diskette drive and/or also avoiding the need for the computer to turn to the fixed disk to find an operating system. However, many users may desire to bring up the machine with a different operating system from that particular version of IBM DOS located in ROM. Therefore, a flexible initialization system has been invented to bypass the operating system located in ROM and thereby enable the user to bring the computer up in an operating system of choice. Additionally, the initialization system of this invention enables the user to bring the computer up already in a particular application. Also, provision is made to allow the reading of special DOS start-up files which alter the start-up which would occur utilizing the entirety of the DOS located in ROM. In that manner, flexibility is provided the user so that initialization results in a customized starting point of the user's choice.

Therefore, it is an object of this invention to provide a computing system which enables the computer user to automatically start the computer in an operating system located in ROM or in the operating system of choice.

It is a further object of this invention to enable the computer user to initialize the computer such that it starts in a selected application.

It is still another object of this invention to enable the user to automatically start the machine in IBM DOS or in a customized version of IBM DOS.

It is still another object of this invention to provide a system that will not lock up, that is, become unusable should a mistake be made by the user in setting the machine parameters for a customized initialization.

SUMMARY OF THE INVENTION

This invention relates to a computer system in which the user is enabled to automatically start the computer from an operating system stored in ROM or in another operating system of choice. The booting sequence has no dependence on data stored on any diskette or disk and the very first initialization will automatically load the operating system stored in ROM and take the user to a screen with a main menu, "the ROM shell", after booting has completed. However, the system also includes customizing bits which are stored in permanent read/write memory which can be, for example, battery backed-up complimentary metal oxide semiconductor random access memory (CMOS RAM) in order to allow the user to change the start up sequence. These bits are initially set to a default state, but can be changed by the user with this invention. In that manner, the user is enabled a great degree of freedom in initializing the computer to a selected operating system different from the operating system stored in ROM; to a selected application; or to a personalized version of the operating system stored in ROM. Finally, the initializing system of this invention includes means for preventing system lock up rendering the computer useless; provision is made for enabling system start under default conditions in such event.

BRIEF DESCRIPTION OF THE DRAWING

This invention is set forth in detail below with reference to the accompanying drawing, a brief description of which follows.

FIG. 3 comprised of FIGS. 3A and 3B, is a flowchart of the flexible initialization system of the instant invention.

DETAILED DESCRIPTION

Figure 1:
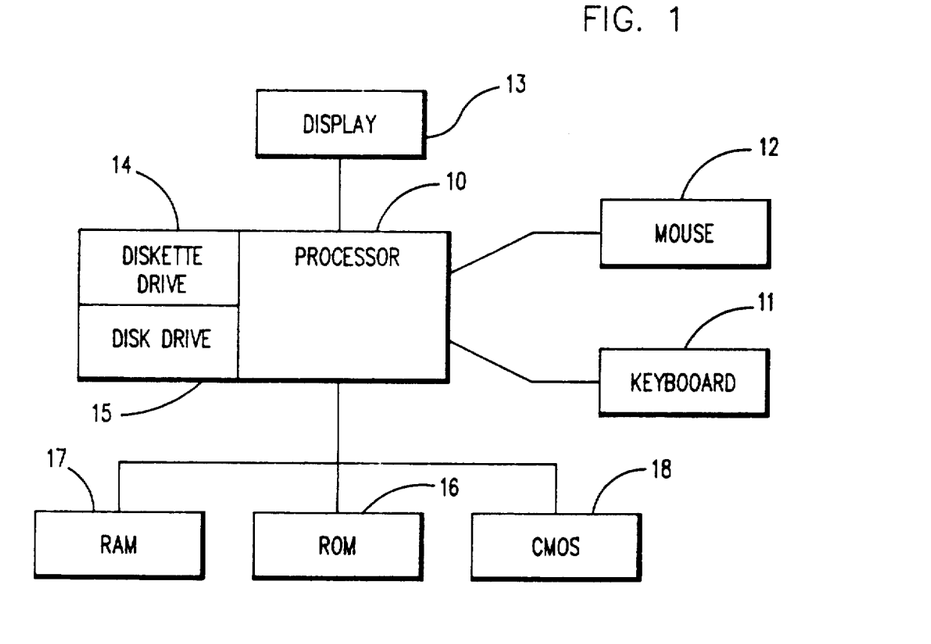
FIG. 1 shows major elements of the computer system.

FIG. 1 shows a typical configuration of a computing system utilizing the instant invention. The system processor component 10 includes means for accomplishing all required arithmetic computations and logic functions and includes means for receiving and sending data from all connected devices. Input to processor 10 can be received from keyboard 11 or mouse 12 which are alternative sources of manual input from the computer user.

The display device 13 may be any standard display such as a CRT. The system will include system drive devices for holding external memory such as a diskette drive 14 and possibly a disk drive 15 as illustrated in FIG. 1. The system will include read-only-memory (ROM) 16, random access memory (RAM) 17 and CMOS 18. The latter memory is backed up by battery and can thereby retain data during periods when computer power is off.

Figure 2:
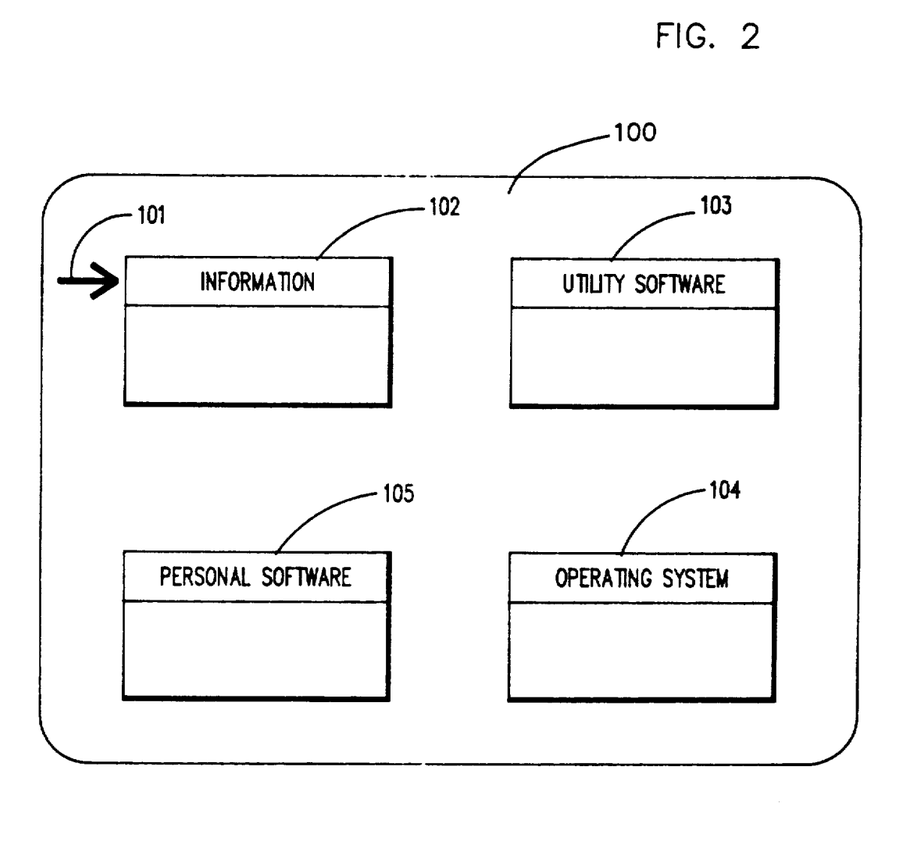
FIG. 2 is a depiction of the default display screen which appears upon initialization of the system of FIG. 1.

ROM 16 contains all of the programs needed for initializing the computing system. For example, ROM 16 contains the basic input/output system routines (BIOS), and it contains a version of IBM DOS 16B so that upon completion of the initialization routines 16A that operating system is resident in RAM and ready to go. However, instead of initializing to the DOS "prompt" as is usually the case, a special routine called the "System Menu" has been developed which produces a screen for enabling the computer user to choose functions from a convenient menu thereby alleviating the need to understand DOS commands and typing those commands at the DOS "prompt". That special screen is also stored in ROM and is called the "ROM Shell" screen. FIG. 2 shows the "ROM Shell" screen 100 and shows that the user is given four choices. Through use of this screen and through the keyboard 11 or the mouse 12 to manipulate the cursor 101, the user can select from the Information category 102, from the Utility Software category 103, from the Operating System category 104 or from the Personal Software category 105.

In selecting from the ROM Shell screen, the user may select the Information category by positioning the cursor 101 as shown in FIG. 2, and then pressing the "enter" key on the keyboard or mouse. Upon that selection, a subsequent screen will automatically appear providing the user the opportunity to select from further programs which are included under Information. Such programs might, for example, be an on-line shopping service such as PRODIGY or a computer Users Club. If the user were to select Utility Software which might include a word processor or spreadsheet program, for example, the trademarked MICROSOFT WORKS program, a screen would appear which would provide a list of functions within MICROSOFT WORKS from which the user could select. If the user selects the Operating System category, and the resident operating system is IBM DOS, then a list of IBM DOS functions appears on the screen again for user selection. Similarly, if the Personal Software category is selected, then a list of those programs which the user has established in his own directory would appear on the screen for user selection. In that manner, the user can select the program or the function desired and can go directly to that function or program without the necessity of writing out commands on the screen. For example, should a user wish to make a back up copy of the fixed disk or of a diskette, the IBM DOS category should be selected whereupon a menu of the type of functions available in IBM DOS appears on the screen. The user would then move the cursor to select "back up copy" and by pressing the mouse key or the enter key on the keyboard, a back up copy would be made on a diskette inserted into drive 14. This illustrates the simplicity of the system; in previous machines the proper command for making a back up copy would have to be spelled out at the DOS prompt in order to perform the function.

As described above, the computing system shown in FIG. 1 contains a version of IBM DOS 16B in ROM which is automatically loaded during the initialization process. That activity speeds the initialization of the system and eliminates the common steps in the prior art of inserting a diskette containing IBM DOS into the diskette drive and then initializing the system. While this new initialization procedure is useful and aids the ease through which the machine is used, at times the user may wish to load a different version of IBM DOS or a completely different operating system 6 such as OS/2, AIX, UNIX or any other operating system suitable for the computing system. As a consequence, it is desirable that the initialization routine be flexible so that these alternate operating systems can be loaded if desired.

Many users prefer to operate their computer in particular applications a high percentage of the time. For these users, the prior art has required the loading of that application after previously initializing the machine and bringing it up in a certain operating system. Therefore, it is desirable that applications 9 be included within the initialization so that, if desired, the user can bring the machine up already in the application of choice. For example, the user might always want to bring the machine up in MICROSOFT WORKS, or in LOTUS 1-2-3. It would also be desirable for the user to be able to return to an operating system from such programs or from whatever other application program the user has selected for initialization so that other applications can be run. A description of the flexible initialization process of the instant invention will now be described.

Figure 3A:
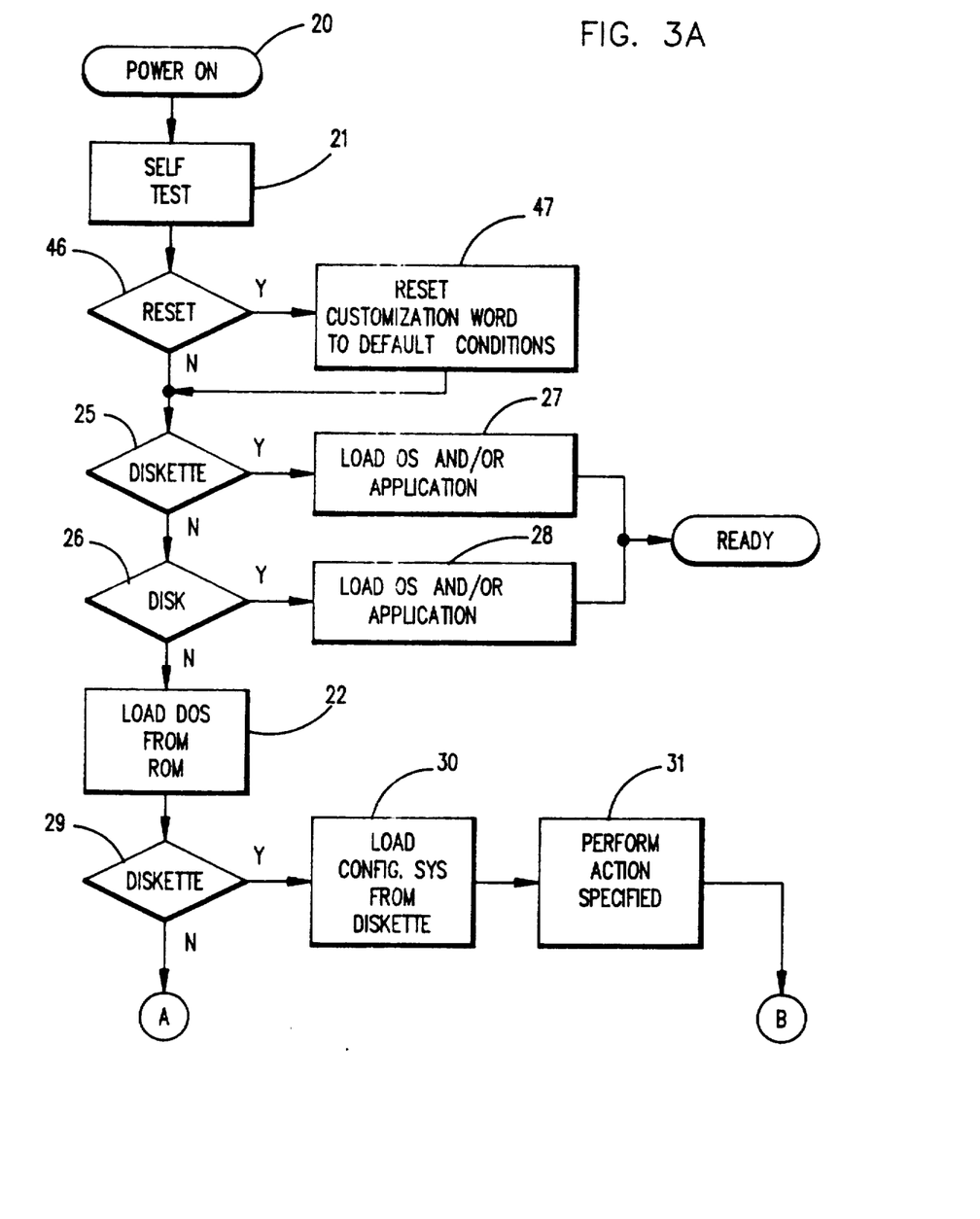
Figure 3B:
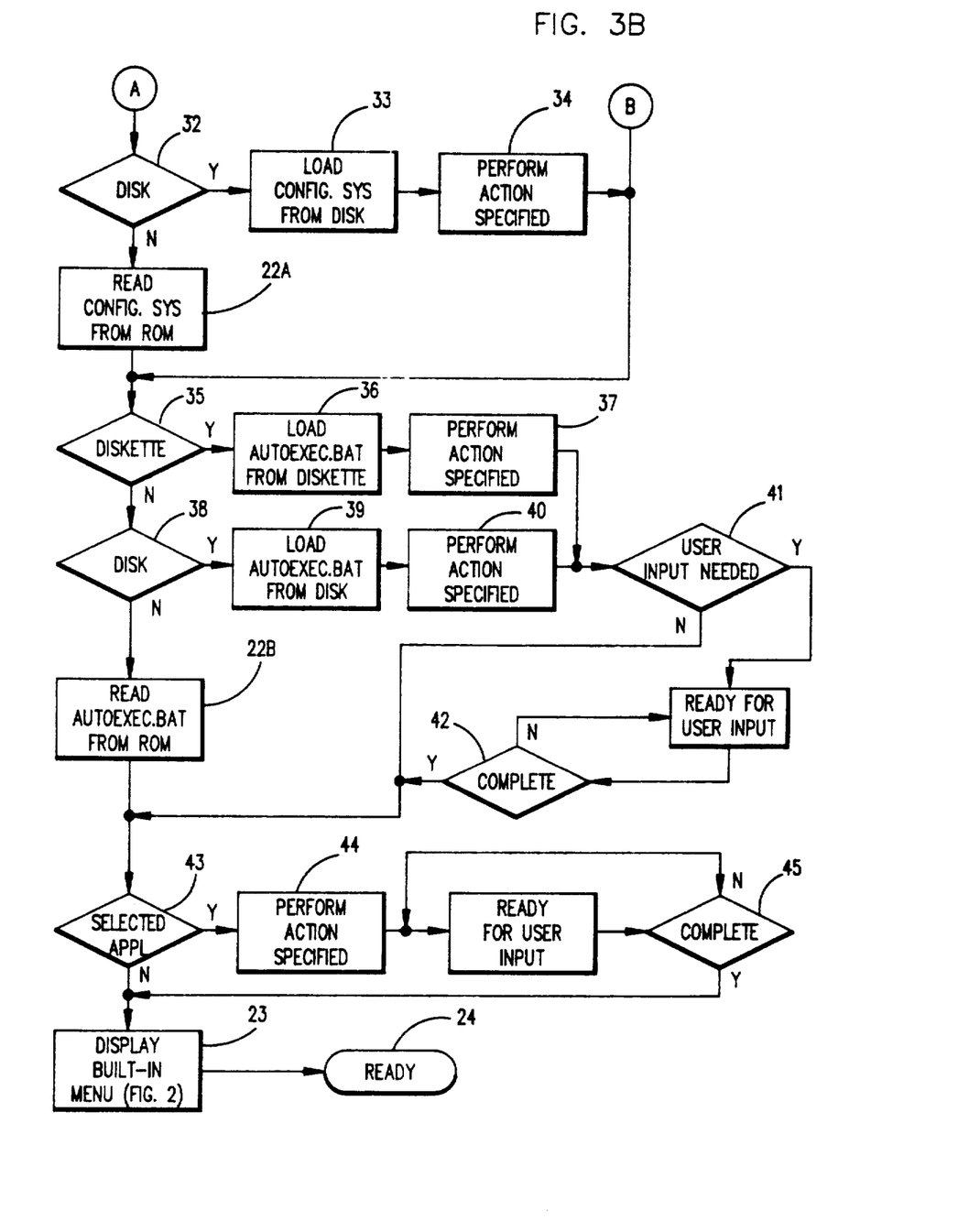

FIG. 3 shows the steps taken for default initialization in order to load IBM DOS and display the ROM Shell screen. When the machine is powered on at step 20, various self-test routines are run at step 21 in order to ascertain that all components of the computing system are ready. For default initialization, the procedure then falls through various intermediate actions shown in FIG. 3 to steps 22, 22A and 22B where the version of IBM DOS located in ROM is loaded, together with the CONFIG.SYS and AUTOEXEC.BAT files located in ROM. Thereafter, the ROM shell screen appears on display 13, step 23, and the computing system is ready for use as shown at step 24.

Provision is made, however, for a flexible initialization of the machine such that if the user wishes to load another operating system, the various intermediate actions shown in FIG. 3 intercept the default initialization process. For example, at step 25 or at step 26, flags are inspected, and if set, the diskette drive and the fixed disk drive are addressed in order to load an alternate operating system 6 at step 27 or step 28. The user could have a diskette, for example, loaded in the diskette drive 14 so that an alternate operating system on the diskette could be loaded at step 27. If the user desires to load a game of some kind, and since many games include their own simplified operating systems, the computer can be initialized in that game through a branch taken at step 25 to load the game diskette at step 27.

In default initialization, booting the system occurs entirely from ROM 16, and various IBM DOS files in ROM are utilized including a CONFIG.SYS file and an AUTOEXEC.BAT file. The CONFIG.SYS file configures the computing system to work with certain peripheral devices, for example, printers and additional memory. The AUTOEXEC.BAT file loads preselected routines so that the operator need not load them individually on each initialization. More sophisticated users of the computing system may want to customize one or both of these files for their particular use. For example, a user might want to change the mouse driver routine and therefore might want to change the CONFIG.SYS file. The flexible initialization routine of the instant invention provides mechanisms for the sophisticated user to bring the system up with the particular mouse driver routine of choice. This is accomplished by placing the alternate CONFIG.SYS file 7 on a diskette, setting a flag, inserting the diskette into the diskette drive 14 and bringing the system up with those files instead of the default files on ROM 16. This is shown in FIG. 3 at steps 29, 30 and 31 and for the use of the fixed disk to perform the operation, at steps 32, 33 and 34. Similarly, reading external memory for an alternate AUTOEXEC.BAT file 8 is shown at steps 35, 36 and 37 for the diskette drive and at steps 38, 39 and 40 for the disk drive. Note that in using the AUTOEXEC.BAT file, the computer user can bring the system up in an application of his choice, for example, the trademarked LOTUS 1-2-3 program, so that if the alternate AUTOEXEC.BAT file is altered to contain the LOTUS 1-2-3 program, the system will come up with a request for appropriate user input in that application as shown at step 41. After completion at step 42 of the use of the LOTUS 1-2-3 program, or whatever application may have been loaded, a branch is then made to display the IBM DOS ROM Shell screen as shown at step 23, assuming that no applications have been selected for initialization at step 43. Step 43 will be discussed below.

Figure 4:
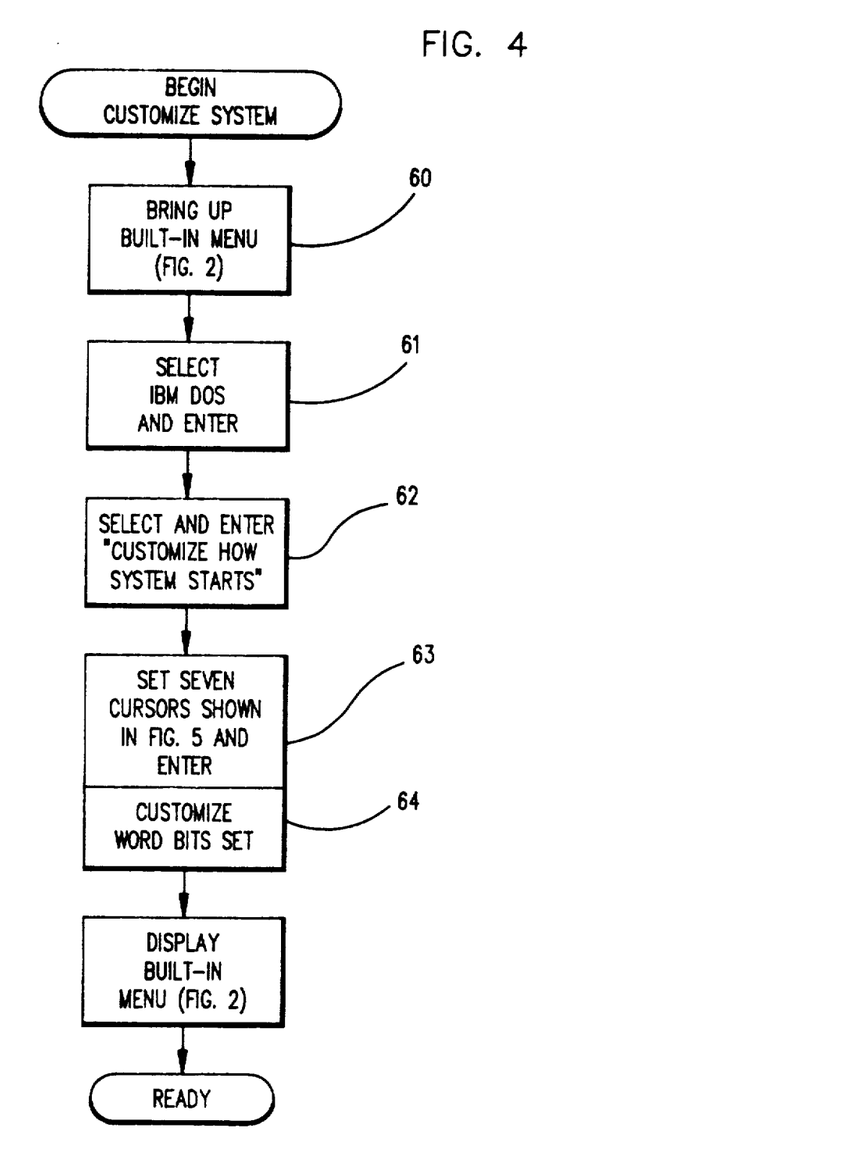
FIG. 4 is a flowchart providing further details of the manner in which initialization is customized.

While the flexible nature of the initialization routine has been described, the manner in which the user is enabled to have such flexibility will now be discussed. As previously stated, the system upon default initialization provides the ROM Shell screen shown in FIG. 2. When the user wishes to customize initialization, a start is made with the ROM Shell screen at step 60 as shown in FIG. 4. On that screen, the user selects the IBM DOS category as shown at step 61. As previously described, that will result in a screen showing various functions available to the user in IBM DOS. One of those functions is titled "Customize How The System Starts". The user will then select that function at step 62 which thereupon brings up the screen shown in FIG. 5. The user then selects the particular initialization routine he wishes to exercise as shown at step 63, save the changes as shown at step 64 and thereafter will experience initialization in the customized fashion just selected.

Figure 5:
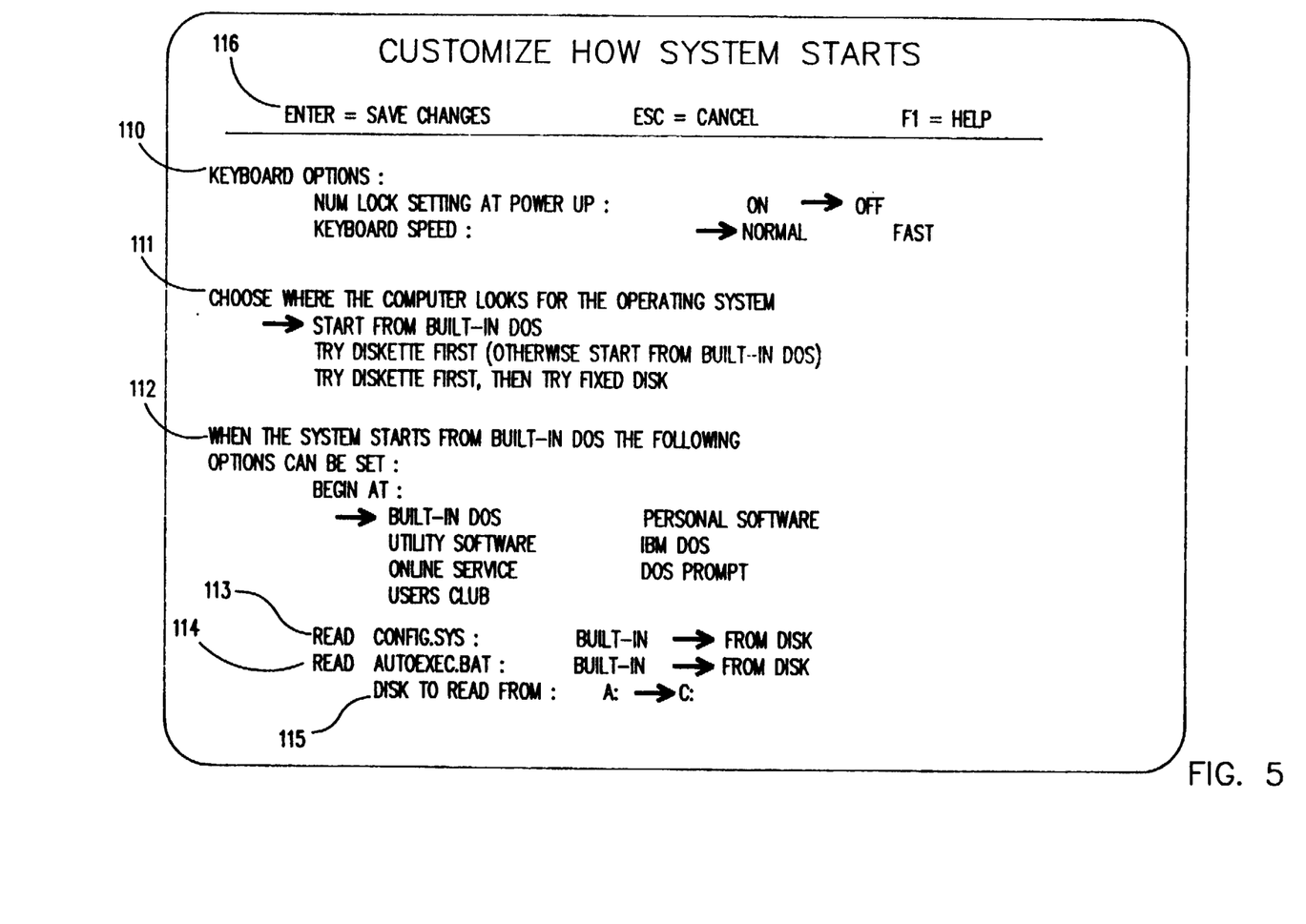
FIG. 5 shows the display screen used for selecting options in directing changes for machine initialization.

FIG. 5 shows the various customizing options available. For example, for the keyboard options 110 the user can bring up the computer with the keyboard number lock setting off or on, and can select either a normal or fast keyboard speed. More pertinent to the discussion of this invention, FIG. 5 shows that the user can "choose where the computer looks for the operating system" 111, in order to change the start from "Built in DOS" which is the default operating system. The initialization routine can be instructed to try the diskette first and then go to "Built in DOS", or the computer can be instructed to try the diskette first and then try the fixed disk. By moving the cursor with either the mouse or the keyboard, these other options can be selected. It is in that manner that the user can select an alternate operating system.

If the user desires to start the system in "Built in DOS" but desires to skip the need for selecting from the ROM shell screen shown in FIG. 2, a selection can be made at 112 of Utility Software or of an on-line service or of Users Club or of an IBM DOS Shell showing the various functions in IBM DOS, or of the DOS Prompt or of the category Personal Software, which displays the user's own directory of programs.

If the user desires to utilize an alternate CONFIG.SYS or AUTOEXEC.BAT file, the selection can be indicated near the bottom of the screen shown in FIG. 5 at 113 and 114 together with the appropriate drive from which to read at 115.

The use of the customization screen shown in FIG. 5 with the placing of the seven cursors in desired locations creates a customized start by saving the changes upon pressing of the enter key as shown at 116. The options are saved by setting flags (bits) in a special "customization word" located in RAM and then transferring the word to the battery backed up CMOS 18. In that manner, the word is retained when the computer is powered down during the period of non-use. The next time that the user approaches the machine and turns it on, the initialization routine inspects that customization word in order to ascertain how the bits have been set and in that manner knows which branch to take at step 25, at step 26, and at steps 29, 32 and 35, as well as at step 43. If, for example, Utility Software was chosen on the screen shown in FIG. 5 as the selected option in which to bring up the machine, when the initialization routine shown in FIG. 3 reaches step 43, a "selected application" notation would be observed and a branch would be made to bring the machine up as shown at step 44. The specified action at step 44 would be to bring the machine up in Utility Software. Again, should the user wish to return to the ROM Shell screen at step 23 to utilize some application other than Utility Software, a return can be made to the ROM Shell screen at step 45 as shown in FIG. 3.

Use of the screen shown in FIG. 5 results in a setting of the customization word. That word is shown below.

| Customize Word Bit Definitions | | | | | | | | | | | | | | | |
| --- | --- | --- | --- | --- | --- | --- | --- | --- | --- | --- | --- | --- | --- | --- | --- |
| Bit | F | E | D | C | B | A | 9 | 8 | 7 | 6 | 5 | 4 | 3 | 2 | 1 | 0 |
| Value | CC | SD | SD | SD | SD | SD | BT | BT | NL | AS | AS | AS | R | SR | C | A |

CC - First Time Flag for COMMAND.COM for displaying ROMSHELL or NOT
    1 = COMMAND.COM has not been invoked. (BIOS sets)
    0 = COMMAND.COM has been invoked (COMMAND.COM resets)
SD - Systems Drive
    000 = A: drive
    010 = C: drive
BT - Booting Options
    00 = Boot from ROM
    01 = Try diskette from then from ROM
    10 = Try diskette, then Hard Disk, then boot -continued

| Customize Word Bit Definitions |
|---|
| from ROM |
| 11 = Invalid |
| NL - Num Lock on/off |
| 0 = Num Lock on |
| 1 = Num Lock off |
| AS - Application Select |
| 000 - ROM Shell Menu |
| 001 - Utility Software |
| 010 - On-line Service |
| 011 = User's Club |
| 100 = Personal Software |
| 101 = IBM DOS (DOS Shell) |
| 111 = DOS Prompt |
| SR - Alt-Sysreq boot |
| 1 = Alt-Sysreq boot |
| 0 = Normal boot |
| C - Read Config.sys |
| 0 = Read Config.sys from ROM |
| 1 = Read Config.sys from Sys drive |
| A - Read Autoexec.bat |
| 0 = Read Autoexec.bat from ROM |
| 1 = Read Autoexec.bat from Sys drive |

Thus, for example, if the user desires to repeatedly bring up an alternate operating system, the BT bits will be set to 01 in order to instruct the initialization routine to go to the diskette drive rather than to use the IBM DOS located in ROM. Should the alternate system be on the fixed disk drive, the BT bits will be set to 10.

The use of the screen shown in FIG. 5 can result in the selection of an alternate application in which to bring up the system in which case the "AS" bits will be set to bring the system up in Utility Software 001, On-line Service 010, Users Club 011, Personal Software 100, the IBM DOS Shell 101, or the DOS prompt 111. If "Personal Software" is selected, then the machine can be brought up showing a list of programs which the user has established in his own directory.

Should the sophisticated user wish to change the default CONFIG.SYS or default AUTOEXEC.BAT selection to a personalized file, the screen shown in FIG. 5 enables the user to set the C bit and the A bit accordingly, and also, to set the SD bits to read either the diskette drive (the A drive) or from the disk drive (the C drive).

As described above, the user is provided with a powerful initialization routine to allow him great flexibility in causing the machine to boot from other drives, to automatically start applications and to read DOS start up files from either the hard disk or diskette drive. However, problems can occur with allowing the user this much freedom. For example, the user could effectively lock himself out of the use of his computing system. This might be done by placing an incorrect instruction in the CONFIG.SYS file such as calling for an incorrect device name. In such case, when the system is started and this line is read, the system will lock up. If the file is being read from the hard disk, there will be no way for the user to recover and he will not be able to use the computing system without a service call.

This invention describes a technique to give the user a way of always being able to reset the computing system to the default configuration. In that manner, if he has written a bad DOS start up file or has deleted the partition on his hard disk and doesn't have a bootable diskette, he can recover and still be able to use the computing system. The technique calls for the initializing routine to check manually operated indicia for a user initiated condition during the power up sequence. This condition can be the holding down of the mouse button or holding a specified key or set of keys (keyboard 11, FIG. 1) when the power on switch is thrown. During power up, the initializing routine immediately checks for the state of the manually operated indicia as shown at step 46 in FIG. 3. If it is in the designated state, at step 47 the initializing routine then resets the bits in the customizing word in RAM which defines the system start up options. By resetting the options to their default state, the machine is thereby returned to a known state. That is, it will boot from DOS in ROM at step 22 and begin at the ROM shell menu. The various special DOS start up files will not be read but instead, files located in ROM will be read at steps 22A and 22B. In that manner, the user can utilize the computer, the user can correct the problem that caused the lock out, and can again attempt to customize system start up in the manner described above.

While the system has been described with reference to a preferred embodiment, it will be understood by those skilled in the art that many changes in form and detail may be made without departing from the spirit and scope of the invention.

What is claimed is:

1. A computer system with an initialization routine located therein which affords said system the capability of automatically initializing itself in an operating system of choice, comprising:

a data processor;

random access memory (RAM), read only memory (ROM) and permanent read/write memory, all connected to said data processor, said initialization routine located in said ROM for controlling the initialization of said computer system upon power on;

a default operating system located in said ROM for transfer into said RAM by said initialization routine for controlling the operation of said computer system upon completion of system initialization;

system drive means connected to said processor for holding external memory means such as flexible diskettes and/or fixed disks, said external memory means for holding at least one alternative operating system and applications;

customization word means located in said permanent read/write memory for containing bits including a first set of bits to which said initialization routine refers to determine whether said computer system is to be initialized with said default operating system or with an alternative operating system, and also includes a second set of bits to which said initialization routine refers to determine whether said computer system is to be initialized into a customized version of said default operating system through replacement of the default CONFIG.SYS file and/or the default AUTOEXEC.BAT file in said default operating system with an alternate CONFIG.SYS file or alternate AUTOEXEC.BAT file located in said external memory;

manually operated input means connected to said processor for enabling the user of said computer system to change the state of said first set of bits contained in said customization word means to provide for user selection of an operating system into which said computer system may be initialized, said manually operated means further provided for enabling the user of said computer system with means for changing the state of said system customization bits to provide for user selection of a customized version of said default operating system, said manually operated input means including reset means for resetting said system customization bits to provide for initialization of said computer system with said default CONFIG.SYS file and said default AUTOEXEC.BAT file in said default operating system, said reset means including manually operable indicia means such as a specific key or combination of keys on a keyboard for enabling the user of said computer system to change the state of said system configuration bits to provide for the initialization of said computer system with said default files, said reset means for use during initialization in the event that the computer system does not complete initialization due to an error in said alternate CONFIG.SYS and/or said alternate AUTOEXEC.BAT files.

2. A computer system with an initialization routine located therein which affords said system the capability of automatically initializing itself in an operating system of choice, comprising:

a data processor;
random access memory (RAM), read only memory (ROM) and permanent read/write memory, all connected to said data processor, said initialization routine located in said ROM for controlling the initialization of said computer system upon power on;
a default operating system located in said ROM for transfer into said RAM by said initialization routine for controlling the operation of said computer system upon completion of system initialization;
system drive means connected to said processor for holding external memory means such as flexible diskettes and/or fixed disks, said external memory means for holding at least one alternative operating system and applications;
customization word means located in said permanent read/write memory for containing bits including a first set of bits to which said initialization routine refers to determine whether said computer system is to be initialized with said default operating system or with an alternative operating system, and also includes a second set of bits to which said initialization routine refers to determine whether said computer system is to be initialized into a customized version of said default operating system through replacement of the default CONFIG.SYS file and/or the default AUTOEXEC.BAT file in said default operating system with an alternate CONFIG.SYS file or alternate AUTOEXEC.BAT file located in said external memory;

manually operated input means connected to said processor for enabling the user of said computer system to change the state of said first set of bits contained in said customization word means to provide for user selection of an operating system into which said computer system may be initialized, said manually operated means further provided for enabling the user of said computer system with means for changing the state of said system customization bits to provide for user selection of a customized version of said default operating system, said manually operated input means further including reset means for resetting said system customization bits to provide for initialization of said computer system with said default CONFIG.SYS file and said default AUTOEXEC.BAT file in said default operating system, said reset means including manually operable indicia means such as a specific key or combination of keys on a keyboard for enabling the user of said computer system to change the state of said system configuration bits to provide for the initialization of said computer system with said default files, said reset means for use during initialization in the event that the computer system does not complete initialization due to an error in said alternate CONFIG.SYS and/or said alternate AUTOEXEC.BAT files;

display means connected to said processor for providing a visual display to the user, said visual display including a menu of selections to be made by the user for choosing how said computer system is to be initialized, said menu including a first item for selecting said default operating system, a second item for selecting an alternative operating system on said external memory from a flexible diskette, a third item selecting an alternate operating system from said fixed disk, a fifth item for selecting said alternate CONFIG.SYS file, and a sixth item for selecting said alternate AUTOEXEC.BAT file, said display means further including cursor means for indicating the user's selection from said menu.

3. A computer system with an initialization routine located therein which affords said system the capability of automatically initializing itself in an operating system of choice, comprising: a data processor;

random access memory (RAM), read only memory (ROM) and permanent read/write memory, all connected to said data processor, said initialization routine located in said ROM for controlling the initialization of said computer system upon power on;
a default operating system located in said ROM for transfer into said RAM by said initialization routine for controlling the operation of said computer system upon completion of system initialization;
system drive means connected to said processor for holding external memory means such as flexible diskettes and/or fixed disks, said external memory means for holding at least one alternative operating system and applications;

customization word means located in said permanent read/write memory for containing bits including a first set of bits to which said initialization routine refers to determine whether said computer system is to be initialized with said default operating system or with an alternative operating system, said customization word means also including a second set of bits to which said initialization routine refers to determine whether said computer system is to be directly initialized in a user selected application, said customization word also including system customization bits to which said initialization routine refers to determine whether said computer system is to be initialized into a customized version of said default operating system through replacement of the default CONFIG.SYS file and/or the default AUTOEXEC.BAT file in said default operating system with an alternate CONFIG.SYS file or alternate AUTOEXEC.BAT file located in said external memory;

manually operated input means connected to said processor for enabling the user of said computer system to change the state of said first set of bits contained in said customization word means to provide for user selection of an operating system into which said computer system may be initialized, said manually operated means further providing the user means for changing the state of said second set of bits to provide for user selection of said application into which said computer system is to be initialized, said manually operated means further provided for enabling the user of said computer system with means for changing the state of said system customization bits to provide for user selection of a customized version of said default operating system, said manually operated input means further including reset means for resetting said system customization bits to provide for initialization of said computer system with said default CONFIG.SYS file and said default AUTOEXEC.BAT file in said default operating system, said reset means including manually operable indicia means such as a specific key or combination of keys on a keyboard for enabling the user of said computer system to change the state of said system configuration bits to provide for the initialization of said computer system with said default files, said reset means for use during initialization in the event that the computer system does not complete initialization due to an error in said alternate CONFIG.SYS and/or said alternate AUTOEXEC.BAT files;

display means connected to said processor for providing a visual display to the user, said visual display including a menu of selections to be made by the user for choosing how said computer system is to be initialized, said menu including a first item for selecting said default operating system, a second item for selecting an alternate operating system on said external memory from a flexible diskette, a third item for selecting an alternate operating system from said fixed disk, a fourth item for selecting from applications (utility software), a fifth item for selecting said alternate CONFIG.SYS file, and a sixth item for selecting said alternate AUTOEXEC.BAT file, said display means further including cursor means for indicating the user's selection from said menu.

4. A computer system comprising:
a processor;
a read only memory (ROM) coupled to the processor and storing a default routine for initializing the computer system;
a non-volatile memory coupled to the processor and storing user editable information for replacing the default routine with, or modifying the default routine into, a user customized routine for initializing the computer system; and
reset means coupled to the processor for replacing the user customized routine with the default routine in response to a manual input during initialization of the computer system.

5. The computer system of claim 4 wherein the reset means replaces the user customized routine with the default routine in response to a manual input at the initiation of initialization of the computer system.

6. The computer system of claim 5 wherein the manual input is made by pressing at least one button on a mouse coupled to the processor.

7. The computer system of claim 5 wherein the manual input is made by pressing at least one key on a keyboard coupled to the processor.

8. A computer system comprising:
a processor;
a read only memory (ROM) coupled to the processor and storing an operating system therein;
a fixed disk drive coupled to the processor and capable of storing an operating system therein;
a removable disk drive coupled to the processor and capable of storing an operating system on a disk inserted therein; and
means coupled to the processor for initializing the computer system with an operating system stored in one of the ROM, the fixed disk drive, and the removable disk drive, the means including a non-volatile memory storing a user editable priority for selecting the operating system for initializing the computer system from one of the ROM, the fixed disk drive, and the removable disk drive, the user editable priority one selected from:
A. initializing the computer system with the operating system stored in the ROM;
B. initializing the computer system with the operating system stored in the removable disk drive, if any, and if no operating system is stored in the removable disk drive, initializing the computer system with the operating system stored in the ROM; and
C. initializing the computer system with the operating system stored in the removable disk drive, if any, and if no operating system is stored in the removable disk drive, initializing the computer system with the operating system stored in the fixed disk drive; and
reset means coupled to the processor for replacing the user editable priority, with initializing the computer system with the operating system stored in the ROM, in response to a manual input during initialization of the computer system.

* * * * *